April 15, 1969 D. BLITZ 3,439,333
SIGNAL RECOGNITION APPARATUS HAVING IMPROVED FALSE RESPONSE REJECTION CAPABILITY AND METHOD FOR PROVIDING SAME
Filed Aug. 25, 1967
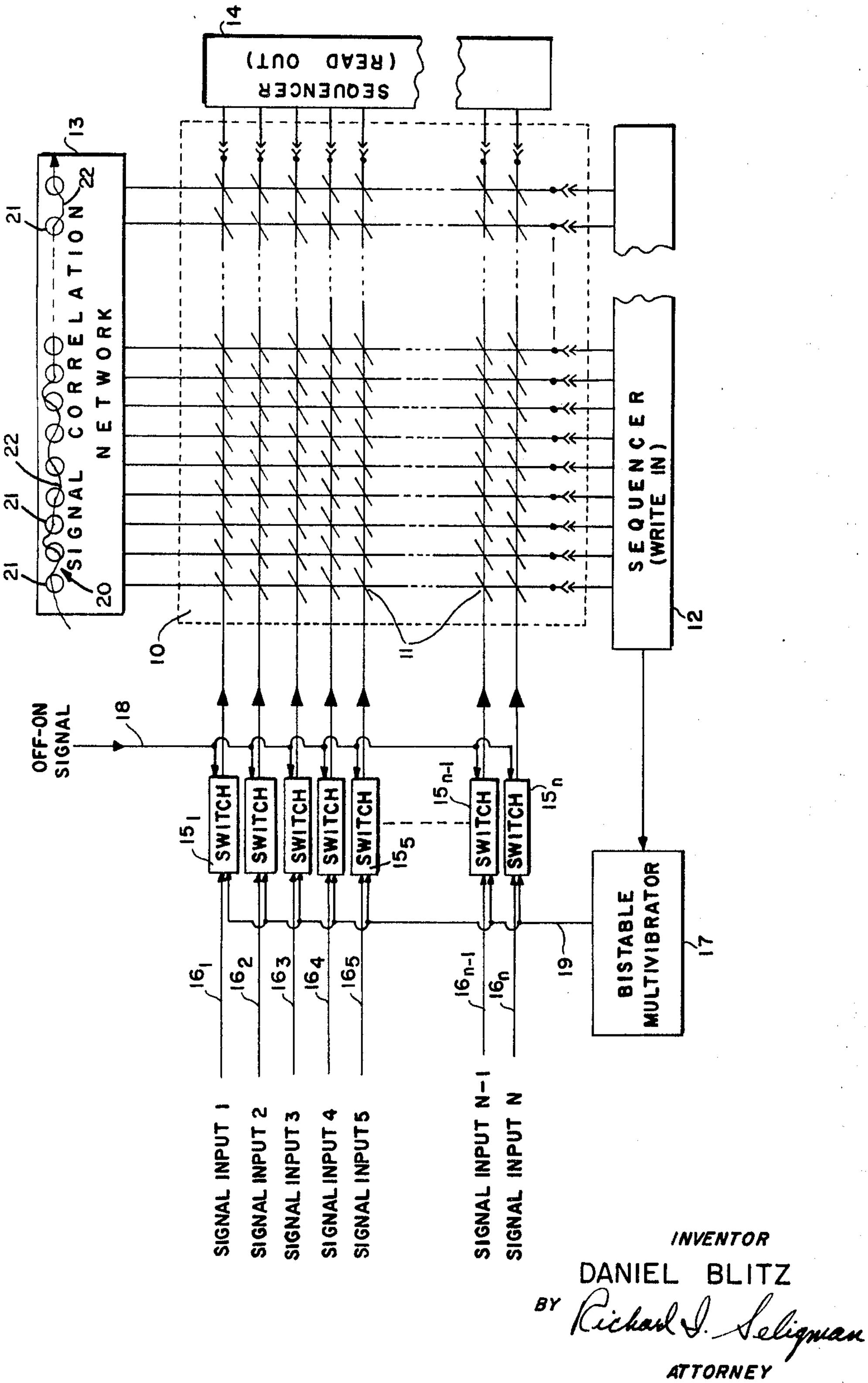
INVENTOR
DANIEL BLITZ
BY Richard I. Seligman
ATTORNEY United States Patent Office 3,439,333
Patented Apr. 15, 1969

3,439,333

SIGNAL RECOGNITION APPARATUS HAVING IMPROVED FALSE RESPONSE REJECTION CAPABILITY AND METHOD FOR PROVIDING SAME

Daniel Blitz, Boston, Mass., assignor to Sanders Associates, Inc., Nashua, N.H., a corporation of Delaware
Filed Aug. 25, 1967, Ser. No. 663,378
Int. Cl. G08b *29/00*
U.S. Cl. 340—146.1 16 Claims

ABSTRACT OF THE DISCLOSURE

In a signal recognition system wherein samples of the signals to be recognized are stored in a magnetic core matrix to be subsequently delivered to summing networks arranged to recognize particular signals, apparatus is provided to store an artificial signal when no true signal is present, which artificial signal is characterized in that it will provide substantial cancellation in the summing networks. The artificial signal is such as to place alternate cores of each row of the storage matrix in a first state and the remaining cores of each row of the matrix in a second state.

The invention herein described was made in the course of or under a contract or subcontract thereunder with the Department of the Navy.

*Background of the invention*

Apparatus for detecting particular signals from a multiplicity of simultaneously appearing signals has previously been disclosed in patent applications for "Signal Correlation Apparatus," Ser. No. 486,410, filed Sept. 9, 1965 and now Patent No. 3,305,658, and "Signal Correlator," Ser. No. 626,164, filed Mar. 27, 1967, both applications assigned to the assignee of this application.

The apparatus in each of the above-mentioned applications includes an orthogonal magnetic core storage matrix suitable to simultaneously store a multiplicity of signals, and a signal correlation network having various summing arrangements responsive to time polarity and amplitude characteristics of particular signals. The signals stored in the storage matrix are delivered to the correlation network for recognition thereof.

One application for such apparatus is disclosed in said patent application, Ser. No. 486,140. The application references use of a correlator network for radar Doppler processing. For example, an exemplary pulse Doppler radar system requires that 250 signals, representing the output of 250 range gates, be simultaneously examined for the presence of doppler information which indicates target speeds. In such a system, some 40 Doppler filters having 0.5-kilocycle bandwidths are utilized to cover a frequency range from 0 to 20 kilocycles. Each of the 250 signals would therefore have to be processed by 40 Doppler filter. Thus, for a radar system having 250 range gates and 0.5-kilocycle resolution in a20-kilocycle frequency range, 10,000 filters would be required to process all possible range and Doppler signals. Additionally, each filter output would require its own detection circuit. Systems of this type which require large numbers of components are prohibitively bulky and expensive.

The size and cost are reduced by providing simultaneous storage of a multiplicity of signals, subsequent read-out of each stored signal, and delivery of the read-out signals to a correlating network. The signals are written onto a magnetic core matrix, and the contents of the matrix are correlated with preserved information to identify characteristics of the signals.

Identification of characteristics of an unknown signal or the detection of the presence of a particular characteristic in the multiplicity of received signals is accomplished by matching all such signals to a predetermined program. Correlation of a compared signal with the preserved information of the predetermined program initiates an output indicative of the presence of that particular signal. Such signal correlation is achieved by storing samples of the signal to be examined at various points representing different moments in its history and then summing the sampled points in such a pattern as to duplicate the characteristics of a desired signal. A signal having characteristics matching this pattern will have its summed points adding to produce a peak output, whereas all other signals will sum with a mixed phase and amplitude relationship. resulting in a low output. Various summing patterns, each responding to a particular characteristic of a signal, can be used simultaneously to supply separate outputs.

One typical correlator network disclosed in said patent application Ser. No. 486,140 is connected to a magnetic core matrix in which input signals are applied and stored. The magnetic core matrix comprises as many rows as there are signals to be stored, and a number of columns equivalent to the number of samples to be made of each incoming signal. The correlator network includes a plurality of weighted resistor networks, each coupled to the columns of the magnetic core matrix, with each resistor network arranged to sum separately outputs appearing on the vertical columns as each horizontal row is read out. The total sum can be applied to a threshold detector which, in the event of a substantial correlation between the time, phase and/or amplitude characteristics of a signal as read out of the storage matrix and a particular resistor network, will give an indication.

A second typical correlator network is disclosed in said patent application Ser. No. 626,164 and includes arrangements of magnetic cores grouped to sum the samples of signals having the phase characteristics of the samples to be recognized.

The signals applied to the storage matrix in both of the above-mentioned patent applications will energize (e.g. switch a core to a one state) particular cores of the matrix when the applied signal is positive (+) and not affect the state of a core (e.g. leave the core in a zero state) when the signal is negative (−). The correlator networks have resistors or cores grouped to sum particular patterns of + and − stored samples of applied signals to produce an indication that a signal(s) of known characteristic has been stored. In the hereinabove mentioned radar application, the correlator networks recognize the presence of particular Doppler frequencies.

In a pulse Doppler radar application, to prevent self-jamming, the radar receiver and transmitter are turned on alternately.

When the incoming signal is off 50% of the time, front end noise is still present and the overall signal to noise ratio deteriorates by 6 db from that obtained when both signal and noise are on continuously. If the front end noise is switched off during signal off time only a 3 db deterioration occurs.

However, during the time that the front end noise is turned off, the input signal to the storage matrix will consist of all zeros (or if desired, all ones). Even in the absence of a true signal, such an input having a constant polarity for 50% of the time, and noise for the other 50% will produce an output in the correlator whose summing arrangement of cores or resistors corresponds to the frequency and phase of the transmit-receive switching cycle.

*Summary of the invention*

Briefly, the invention comprehends, in signal recognition apparatus including storage means for storing the time polarity information contained in a multiplicity of concurrently appearing signals and an arrangement of signal correlating networks wherefrom the presence of particular signals can be detected, means for applying an artifical signal, which is outside the band of interest, to the storage means during the time when signals are not applied thereto to prevent spurious response to cycling—in the above-mentioned radar application the artifical signal is applied during the transmit cycle to prevent spurious response to the transmit/receive duty frequency.

Accordingly, it is an object of this invention to provide signal recognition apparatus having improved capability against false responses.

It is another object of this invention to provide Doppler frequency recognition apparatus non-responsive to the transmit/receive duty cycle.

*Brief description of the drawing*

The above-mentioned and other features and objects of this invention will become more apparent by reference to the following description, taken in conjunction with the accompanying drawing which is a schematic representation of a storage matrix in combination with a block diagram of a correlator and block diagram of means for providing artifical signal injection into the storage matrix.

*Description of a preferred embodiment*

Referring to the figure, there is illustrated thereby one embodiment of this invention.

In previously filed applications (Ser. No. 486,140, filed Sept. 9, 1965 and Ser. No. 626,164, filed Mar. 27, 1967) signal recognition apparatus has been disclosed. The previously disclosed apparatus includes a storage matrix similar to the matrix 10 of the figure, comprising a multiplicity of magnetic cores 11 arranged at the intersections of the rows and columns of the matrix. The input signals to be recognized are applied to the horizontal row wires of the matrix for storage. A signal is stored (written onto a core 11) when the core is simultaneously excited by an input onto the horizontal row wire and a write pulse from a sequencer 12. The function of a sequencer 12 is to provide write pulses to the vertical column wires of the matrix in a serial fashion at the rate at which the incoming signals are to be sampled, and can comprise a simple pulse generator and shift register arrangement. The means for gaining the proper level of signal to be written onto the cores are well-known and are not shown, but could comprise amplifiers, limiters, etc. Reference may be had to the aforementioned patent application, Ser. No. 486,140, wherein such equipment is discussed in detail.

A correlator 13 which comprises resistor or magnetic core summary networks is coupled to matrix 10, each summary network being constructed to provide a maximum correlation when a desired signal is applied thereto.

In one embodiment, signal correlation network or correlator 13 comprises a multiplicity of summing networks 20 (one only being shown here) of magnetic cores 21 so wired (stitched) by a corresponding multiplicity of stitch wires 22 so as to recognize signals applied thereto. The cores 21 of the stitch network 20 are stitched in such a manner as to algebraically sum the signals presented thereto so as to produce a maximized output signal from a stitch or summing network when the signal to be recognized is applied thereto.

After the signals are stored in matrix 10, they can be read out of the matrix one row at a time and applied to correlator network 13 to be recognized. The signals are read out of matrix 10 employing a read-out sequencer 14.

In reading out storage matrix 10, the horizontal row wires are pulsed successively by read-out pulses from read-out sequencer 14. When a substantially large read-out pulse is applied to a horizontal row wire, the magnetic cores in the particular row which have been previously energized and placed in a 1 state are de-energized and placed back in a 0 state. This is destructive read-out, which causes pulses to appear on appropriate vertical drive wires. These pulses are then summed by the summing networks. Magnetic cores of matrix 10 that had been at a 0 state are unaffected by the read-out pulse, and no signal appears on those vertical wires. In the event that the time phase characteristics of the signal derived from the horizontal row wires coincide with a particular summing network of the correlator, a maximum signal output from that summing network will be obtained.

Signals delivered to the correlation network which do not coincide with the summing networks therein will substantially be cancelled out and little or no output will be derived therefrom. Anyway the signal will be less than the level required to cause a threshold device to signify correlation.

In the correlator of Ser. No. 626,164 the summing networks comprise arrangements of magnetic cores grouped to sum the samples of signals having the phase characteristics of the samples to be recognized. The cores are wired to provide a negative, positive or no output at all for each particular position within the matrix.

Employing signal recognition apparatus, as described above, in a pulse Doppler radar application wherein the radar receiver and transmitter are operated at a 50% duty cycle can cause unwanted responses from the correlator.

To prevent self-jamming, the radar receiver and transmitter are turned on alternately with approximately 50% duty factor. As a result, there are several intervals when there is no incoming signal and only front end noise will be present.

If the incoming signal is off 50% of the time, but the noise is on continuously, the signal to noise ratio will deteriorate by 6 db from that obtained when both signal and noise are on continuously. By switching off the front end noise at the same time as the signal, the signal to noise ratio will deteriorate only 3 db.

During the time that the front end noise is turned off, the input signal to the storage matrix will consist of all zeros (or if desired, all ones). Even in the absence of a true signal, such an input having a constant polarity for 50% of the time, and noise for the other 50%, will produce an output in that correlator whose wiring corresponds to the frequency and phase of the transmit-receive switching cycle.

For example, if the summing network of the correlator is wired $$++++++------++++++------ \qquad (A)$$

the desired signal, if on continuously, would have corresponding input polarities $$++++++------++++++------ \qquad (B)$$

and would produce an output of +12. (A signal with only 50% duty cycle would have an output of +6.)

Noise alone, when on continuously, would tend to have equal amounts of "+" and "—" scattered at random, such as $$+--+-+--+-+--++--++-++-+ \qquad (C)$$

which when passed through the correlator of (A), would have a net output of zero.

If the receiver switching is such as to turn off the noise and produce a "—" at those times when the correlator wiring of (A) is also "—" then the noise signal of (C) would be shown as RCVR off RCVR off $$+--+-+ \;\; ------ \;\; -++--+ \;\; ------$$

and the net output in the absence of signal would no longer be zero, but would be +6.

To prevent this, this invention provides for injecting an artificial signal into the storage matrix during the receive "off" time, consisting of alternate "+" and "—," as shown in (E).

RCVR off RCVR off

+−−+−+ +−+−+− −++−−+ +−+−+− (E)

Such an injected input signal has an equal number of "+" and "—," which balances out against the average noise during the receiver "on" time, and the output from the correlator is again reduced to zero in the absence of a true signal.

The advantage of the injected alternate "+" and "—" signal is that it should always average out close to zero regardless of the frequency to which the correlator is wired, whereas leaving the noise on during the receiver "off" time would typically cause some net output (unlike the carefully chosen noise sample shown in C which, nevertheless, would have produced an output in a correlator of a different frequency).

Stated in another way, if the storage matrix input is of constant polarity during the receiver "off" time, the resulting signal is essentially a DC chopped at the receiver switching frequency. This is somewhat similar to transmit-receive modulation of a strong ground clutter signal, and will produce an output in that correlator which matches the modulation frequency and phase. Even with no signal present, the resulting output will be as strong as a typical saturated signal of 50% duty cycle. Leaving the noise on during the receiver "off" time would remove such a DC component, but its AC content would always produce some additional noise output in one or more frequency correlators, decreasing the signal-to-noise ratio. However, the injected alternate "+" and "—" represents a high frequency signal outside the band of interest, and therefore none of the correlators should respond strongly to it.

One exemplary method of providing an artificial injected signal of alternating "+" and "—"during the time when a receiver is off is illustrated in the figure. Other methods will be obvious to those skilled in the art.

When the receiver is on, samples of input signals one–*n* incident on signal line 16, —$\mathbf{16_n}$ are written onto cores 11 of matrix 10. A particular core 11 is energized when a signal arrives on the row wire coupling the particular core coincidently with a signal from write in sequencer 12 to the column wire coupling the particular core. The input signals 1–*n* are applied via a multiplicity of switches 15, —$\mathbf{15_n}$, one switch for each corresponding horizontal row wire of matrix 10. The switches 15, —$\mathbf{15_n}$ in this illustrative embodiment are single pole double throw switches. The switches have first and second input terminals and a single output terminal. The output terminal is switched from the first input terminal to the second input terminal by a signal on a line 18. This is exemplary only and the system would perform equally well if the signal on line 18 would switch the output terminal from the second to the first input terminal. This sequence depends upon whether the signal on line 18 indicates receiver-off or receiver-on.

For this embodiment the signal on line 18 indicates that the receiver is off. When the receiver is off the output terminal of switches 15, —$\mathbf{15_n}$ are connected to the second input terminals of the switches which have coupled thereto an output from a flip-flop 17. Thus, no information incoming on lines 16, —$\mathbf{16_n}$ is passed to the matrix during this time, rather, the signal from flip-flop 17 is stored therein. Flip-flop 17 is operated by write in sequencer 12. Thus, output 19 from flip-flop 17 is switched between zero and one states at the rate determined by sequencer 12 which causes cores 11 in each row to be alternately placed in one, zero, one, zero etc. states. Although a flip-flop is illustrated as the one-zero generator, this is exemplary only.

When the receiver is turned on again, the outputs from switches 15 are again connected to the lines 16 to store samples of the signal inputs in the matrix.

Although to illustrate the principles of this invention it has been described in a pulse Doppler radar application, by no means is this indicative of its only application. The principles of the invention may be employed in any application where incoming informaton is to be stored and recognzed and where the information is delivered in fragments. The principles outlined are applicable to data processing systems, speech recognition devices, number testing apparatus, acoustic processing such as sonobuoy signature recognition devices, oil exploration systems, as well as radar systems. Thus, it is to be understood that the embodiments shown are illustrative only, and that many variations and modifications may be made without departing from the principles of the invention herein disclosed and defined by the appended claims.

What is claimed is:

1. In a signal recognition system wherein samples of the signal to be recognized are stored for subsequent delivery to summing networks arranged to recognize particular signals, the improvement comprising apparatus for storing signals of a predetermined characteristic when actual signals are unavailable.

2. In a signal recognition system as defined in claim 1 wherein said predetermined characteristic is such as to substantially undergo cancellation in said summing networks.

3. Apparatus for signal identifications, comprising:

means for storing the time polarity characteristics of a portion of a signal;

means responsive to the phase characteristics as a function of time of a particular signal;

means for applying an artificial signal to said storage means during intervals when true signals are not being stored; and means for delivering to said means responsive said signals stored in said storage means.

4. Apparatus for signal identification as defined in claim 3, wherein said storage means includes an orthogonal matrix having a multiplicity of magnetic cores arranged in rows and columns, said magnetic cores being initially in a 0 state, an electrical conductor connected to the magnetic cores of each row of magnetic cores, and electrical conductor connected to the magnetic cores of each column of magnetic cores, means for applying signals to conductors connecting said rows of magnetic cores, means for first sequentially applying write pulses to conductors connecting said columns of magnetic cores, said write pulses having a magnitude sufficient when coincident with a positive signal to place a magnetic core in a 1 state, and means for subsequently sequentially applying readout pulses to conductors connecting said rows of magnetic cores.

5. Apparatus for signal identification as defined in claim 3, wherein said storage means includes an orthogonal matrix having a multiplicity of magnetic cores arranged in rows and columns, said magnetic cores being initially in a first state, and electrical conductor connected to the magnetic cores of each row of magnetic cores, an electrical conductor connected to the magnetic cores of each column of magnetic cores, means for applying first signals to conductors connecting said rows of magnetic cores, means for first sequentially applying write pulses to conductors connecting said columns of magnetic cores, said write pulses having a magnitude sufficient when coincident with a positive signal to place a magnetic core in a second state, and means for subsequently sequentially applying readout pulses to conductors connecting said rows of magnetic cores.

6. Apparatus for signal identification as defined in claim 5, wherein said means for applying an artificial signal includes means for switching signals applied to said conductors connecting said rows of magnetic cores from said first signals to second signals having a predetermined time polarity characteristic.

7. Apparatus for signal identification as defined in claim 6, wherein said predetermined time polarity characteristic of said second signal is such as to place alternate cores of said rows of magnetic cores of said orthogonal matrix in a first state and the remainder of said cores in a second state.

8. Apparatus for signal identification as defined in claim 7, wherein said means for applying an artificial signal includes a bistable device coupled to said conductors connecting said rows of magnetic cores.

9. Apparatus for signal identification as defined in claim 8, wherein said bistable device is driven by said means for applying write pulses.

10. Apparatus for signal identification as defined in claim 9, wherein said bistable device is a multivibrator.

11. Apparatus for signal identification as defined in claim 6, wherein said means for switching includes a multiplicity of single pole double throw devices having first inputs coupled to said first signals, second inputs coupled to said second signal and outputs coupled to corresponding conductors connecting said rows of magnetic cores.

12. Apparatus for signal recognition as defined in claim 11, further including means for switching said single pole double throw devices when said second signals are to be written onto the rows of said orthogonal matrix.

13. Apparatus for signal identification as defined in claim 3, wherein said means responsive includes an arrangement of elements having a multi-state characteristic grouped to sum substantially all of a multiplicity of simultaneously presented samples representing phase characteristics as a function of time of a particular signal.

14. Apparatus for signal identification as defined in claim 13, wherein said means for applying an artificial signal includes means for switching signals applied to said conductors connecting said rows of magnetic cores from said first signals to second signals having a predetermined time polarity characteristic.

15. Apparatus for signal identification as defined in claim 14, wherein said means responsive further includes a plurality of said summation arrangements of multi-state elements for recognizing the presence of a signal presented thereto, in which said multi-state elements comprise magnetic cores.

16. A method for signal identification comprising the steps of:

storing characteristics of first signals to be recognized;

storing a signal having predetermined characteristics when said first signals are unavailable;

providing apparatus responsive to the said characteristics of said first signals; and delivering said stored signals to said responsive apparatus.

References Cited

UNITED STATES PATENTS 3,353,177 11/1967 Wilmot -------------- 343—5

RODNEY D. BENNETT, *Primary Examiner.*

C. L. WHITHAM, *Assistant Examiner.*

U.S. Cl. X.R.

343—5

PO-1050
(5/69)

UNITED STATES PATENT OFFICE
CERTIFICATE OF CORRECTION

Patent No. 3,439,333 Dated April 15, 1969

Inventor(s) Daniel Blitz

It is certified that error appears in the above-identified patent and that said Letters Patent are hereby corrected as shown below:

Column 1, line 34, the number 486,410 should read--486,140--.

Column 1, line 35, the phrase "and now Patent No. 3,305,658," should be deleted.

SIGNED AND
SEALED

SEP 9 - 1969

(SEAL)
Attest:

Edward M. Fletcher, Jr.
Attesting Officer

WILLIAM E. SCHUYLER, JR
Commissioner of Patents